Sept. 2, 1947.  H. F. MALSEED  2,426,780
SLIDING CUT-OFF GAUGE AND MEASURING DEVICE FOR CIRCULAR SAWS
Filed March 13, 1944
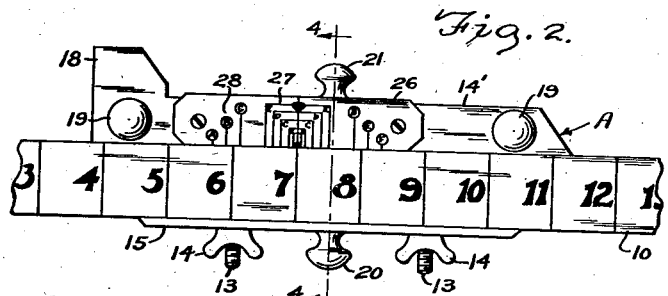
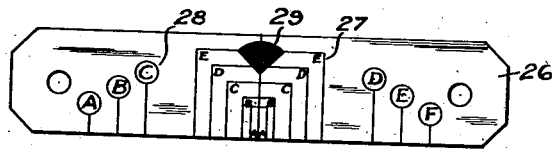
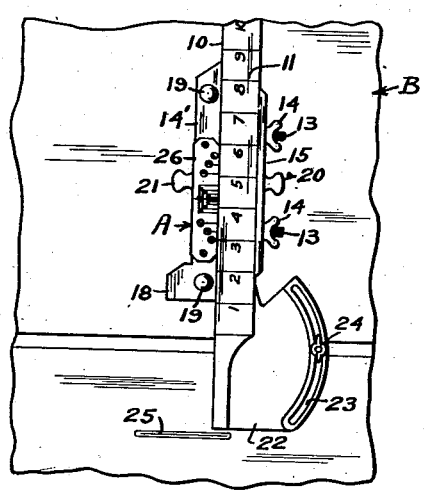
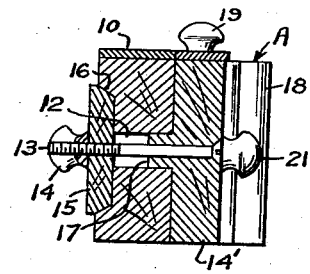
Harry F. Malseed—INVENTOR.
BY
*Victor J. Evans & Co.*
ATTORNEYS Patented Sept. 2, 1947

2,426,780

UNITED STATES PATENT OFFICE 2,426,780

SLIDING CUTOFF GAUGE AND MEASURING DEVICE FOR CIRCULAR SAWS

Harry F. Malseed, St. Louis, Mo.

Application March 13, 1944, Serial No. 526,258

1 Claim. (Cl. 143—174)

The invention relates to a gauge, and more especially to a sliding cut-off gauge and measuring device for circular saws.

The primary object of the invention is the provision of a device of this character, wherein speed and accuracy in woodworking operations is assured and the said device is capable of use in combination with the cutoff guide of saw tables in present day use.

Another object of the invention is the provision of a device of this character, wherein the same is usable for cutting pieces of wood or other like material to an exact length without the use of a rule or any other marking or measuring tool, the device being also adaptable for cutting, grooving and duplicating lengths of material up to 48 inches and longer, if necessary, the duplicating serving for drawer sides and ends, sidings and ends for boxes, panel doors of all kinds and in fact any and all kinds of woodworking operations requiring that several pieces be of the exact measurements.

A further object of the invention is the provision of a device of this character, which is simple in construction, readily and easily adjusted, strong, durable, serviceable for cutting mitres and any other projects demanding mitre joints and for cutting any number of pieces, and also one that is thoroughly reliable and efficient in operation, and inexpensive to manufacture.

With these and other objects in view the invention consists in the features of construction, combination and arrangements of parts as will be hereinafter more fully described, illustrated in the accompanying drawing, and pointed out in the claims hereunto appended.

In the accompanying drawing:

Figure 1 is a plan view of the device constructed in accordance with the invention and applied to a saw table.

Figure 2 is an enlarged fragmentary top plan view of the device.

Figure 3 is a detail elevation of the sliding section of the device.

Figure 4 is a transverse sectional view through the device, taken on the line 4—4 of Figure 2.

Similar reference characters indicate corresponding parts throughout the several views in the drawing.

Referring to the drawing in detail A designates generally the gauge device constructed in accordance with the invention, and B a portion of a table of a circular saw machine of any standard present day construction, respectively.

The gauge device A comprises a sliding rule 10, having on the outer exposed face a lineal measuring scale 11, and formed longitudinally of the rule at the center axis thereof for a major portion of its length is a slot 12 which is carried transversely through opposite faces of the same for the reception of a pair of spaced clamping screws 13, these having binding nuts 14 of the wing type. The screws 13 are fitted in a block 14' and wedging plate 15, respectively, located on opposite sides of the rule 10. The plate 15 is counter-seated at 16 in the side next thereto of the rule 10. The block 14' is provided with a tongue 17 which fits in the slot 12 to maintain the uppermost faces of the rule 10 and block 14' substantially flush with each other under adjustment relative to each other.

The block 14' is formed with an abutment head 18 which projects at right angles thereto at one end of the same, while rising from the uppermost face of this block 14' near opposite ends thereof are hand knobs 19, the plate 15 medially thereof and the block 14', respectively, at the sides of the device A are provided with hand knobs 20 and 21, respectively.

The rule 10 beyond the scale 11 at its end next to the head 18 of the block 14' is formed with a laterally directed segmental wing 22, having the arcuate slot 23 therein, and this slot 23 accommodates an attaching fastener 24, which adjustably locks the device A to the top of the table B for the adjustment of the said device with respect to the circular saw 25 operating through such top to set the work to be cut thereby with accuracy, either cross-cut, mitres or length cutting operation.

The block 14' at its uppermost face and centrally thereof is fitted with a gauge plate 26, having the frame and line scale 27 and 28, respectively, indications thereon, the frame scale being supplemented by markings "A," "B," "C," "D" and "E," together with the center mark at 29, while the line scale 28 is supplemented by the markings "A," "B," "C" and "D," "E" and "F," as shown in the views, Figure 1, Figure 2 and Figure 3, of the drawing.

In the use of the device A, if it is desired to cut a single board to 15 inches in length, and to square the end thereof, the block 14' is adjusted relative to the rule 10 until the line "C" of the frame scale 27 or the center line thereof coincides with the 15 inch marking on the rule, and thereupon the block 14 is made fast at this point. Now, the square end of the work is placed against the abutment head 18 and run through the saw. This procedure would also be followed in cutting mitres or mitre joints after the device "A" has been set under adjustment for the particular angle required. The attaching fastener 24 follows the slot 30 in the table B for advancing the work with respect to the saw 25 to effect cutting operation on the work.

The sliding gauge device "A" is a precision instrument and therefore requires some study before mastering all of its uses, together with its manipulations.

The markings 28 at the right and left of the markings 27 represent the thickness of the different blades and are for the purpose of fitting pieces on certain kinds of work requiring numerous other operations than have already been mentioned heretofore.

The scale 27 is to compensate for the thickness of the saw blade, groovers, chippers or the like, for example "A" on the scale 27 denotes the thickness of a single standard grooving blade; "C" represents the thickness of the two grooving blades and "D" and "E" represent the thickness of two grooving blades with the addition of the chippers or inside cutters. For example: it is wanted to cut a groove $\frac{7}{16}$ inch wide and 14 inches from the end of a piece of wood. Two groovers are used which together cut a groove $\frac{1}{4}$ of an inch wide. After making the first cut with the center line "C" placed at the 14 inch mark on the rule the gauge is moved to the left until the "B" line coincides with the $\frac{7}{16}$ inch mark on the rule or $\frac{7}{16}$ of an inch from 14 inch mark on the rule. This will give a cut exactly $\frac{7}{16}$ inch wide. This is a tremendous time-saving feature in operating a circular saw and doing this particular kind of work.

The gauge can be made entirely from metal, if found desirable.

What is claimed is:

In a table saw having a circular saw, a table, a cutoff guide, and a graduated rule with a segmental wing at one end on which the cutoff guide is slidably mounted adjustably mounted on the table, the combination, which comprises, an elongated gauge plate positioned on the cutoff guide having a center indicator positioned to register with graduations of the rule, said registering graduations indicating the distance from the end of the cutoff guide to the near side of the saw, said gauge plate having a series of graduations spaced equidistant from said center indicator and on each side thereof representing the thickness of saw cuts and grooves formed thereby, and another set of graduations also spaced equidistant from said center indicator for setting the cutoff guide for cutting dado and mitre joints and rabbeting, said rule having an elongated horizontally disposed slot therein, a tongue on said cutoff guide extending into the said groove of the rule, screws positioned in the said slot extending through the said rule and cutoff guide, and thumb nuts on the screws for clamping the said cutoff guide in adjusted positions along the rule.

HARRY F. MALSEED.

REFERENCES CITED

The following references are of record in the file of this patent:

UNITED STATES PATENTS

| Number | Name | Date |
| --- | --- | --- |
| 438,029 | Strahl | Oct. 7, 1890 |
| 1,299,367 | McMichael et al. | Apr. 1, 1919 |
| 2,237,556 | Hedgpeth | Apr. 8, 1941 |
| 109,605 | Fitts | Nov. 29, 1870 |
| 141,975 | Xander | Aug. 19, 1873 |
| 2,292,094 | Thomas | Aug. 4, 1942 |
| 2,195,557 | Billker et al. | Apr. 2, 1940 |
| 1,079,110 | Cole | Nov. 18, 1913 |